United States Patent [19]

Horiike et al.

[11] Patent Number: 5,548,619
[45] Date of Patent: Aug. 20, 1996

[54] RADIO RECEIVER APPARATUS OF ORTHOGONAL DETECTION TYPE COMPRISING LOCAL OSCILLATOR MEANS WITH IMPROVED AUTOMATIC FREQUENCY CONTROL ARRANGEMENT

[75] Inventors: Yoshio Horiike, Shijonawate; Yasuo Yoshimura; Yoshiyuki Yokoajiro, both of Yamatokouriyama; Terue Matsumura, Nara; Makoto Hasegawa; Masahiro Mimura, both of Tokyo, all of Japan

[73] Assignee: Matsushita Electric Industrial Co., Ltd., Osaka, Japan

[21] Appl. No.: 374,915

[22] Filed: Jan. 19, 1995

[30] Foreign Application Priority Data

Jul. 20, 1993 [JP] Japan ................................ 5-179006

[51] Int. Cl.⁶ ................................................ H04L 27/06
[52] U.S. Cl. .................... 375/344; 455/192.2; 455/209
[58] Field of Search .......................... 375/344; 329/323, 329/327; 455/173.1, 182.1, 182.2, 192.1, 192.2, 208, 209, 254, 255, 257, 265

[56] References Cited

U.S. PATENT DOCUMENTS

| | | | |
|---|---|---|---|
| 3,949,309 | 4/1976 | Pecar | 325/473 |
| 4,293,818 | 10/1981 | Jarger | 455/208 |
| 4,580,101 | 4/1986 | Lax | 375/376 |
| 4,814,715 | 3/1989 | Kasperkovitz | 329/50 |
| 4,837,853 | 6/1989 | Heck | 455/209 |
| 4,878,029 | 10/1989 | Saulnier et al. | 329/341 |
| 5,253,097 | 10/1993 | Naito et al. | 359/192 |
| 5,396,521 | 3/1995 | Minami | 375/344 |
| 5,416,805 | 5/1995 | Tonello et al. | 375/373 |

FOREIGN PATENT DOCUMENTS

| | | |
|---|---|---|
| 0526836 | 2/1993 | European Pat. Off. . |
| 55-37131 | 9/1980 | Japan . |
| 60-72454 | 4/1985 | Japan . |
| 60-182205 | 9/1985 | Japan . |
| 2137836 | 10/1984 | United Kingdom . |

Primary Examiner—Stephen Chin
Assistant Examiner—Huong Luu
Attorney, Agent, or Firm—McDermott, Will & Emery

[57] ABSTRACT

In a radio receiver apparatus of an orthogonal detection type, a voltage controlled first local oscillator generates a first local oscillation signal, and mixers mix an inputted reception signal with the first local oscillation signal and a 90° shifted signal thereof, respectively, the mixed signals respectively being passed through first and second band-pass filters to obtain desired first intermediate frequency signals. Further, a second local oscillator generates a second local oscillation signal. Further mixers mixes the first intermediate frequency signals from the first and second band-pass filters with the second local oscillation signal and a 90° shifted signal thereof, respectively. Then there is calculated either one of a sum of and a difference between the resulting mixed signals, the calculated signal being passed through a third band-pass filter to obtain a second intermediate frequency signal to be demodulated. Furthermore, an average frequency detector detects an average frequency of the second intermediate frequency signal for a predetermined time interval, and a frequency correction circuit controls the first local oscillation frequency of the first local oscillation signal based on the detected average frequency.

7 Claims, 12 Drawing Sheets

RADIO RECEIVER APPARATUS OF ORTHOGONAL DETECTION TYPE COMPRISING LOCAL OSCILLATOR MEANS WITH IMPROVED AUTOMATIC FREQUENCY CONTROL ARRANGEMENT

BACKGROUND OF THE INVENTION

1. Field of the Invention

The present invention relates to a radio receiver apparatus, and in particular, to a radio receiver apparatus of an orthogonal detection type comprising a local oscillation means with an improved automatic frequency control arrangement.

2. Description of the Related Art

In general, there has been used a single superheterodyne system or a double superheterodyne system as a reception system for radio communications. However, the above-mentioned conventional heterodyne system requires a band-pass filter for removing an image frequency and another band-pass filter for removing signals of adjacent channels. As each of the above-mentioned band-pass filters, a mechanical filter utilizing a mechanical vibration characteristic of crystal or ceramic has been used. Such a mechanical filter is accompanied by such a problem that the size of the mechanical filter is relatively large, and it is relatively expensive. As a reception system for solving the above-mentioned problem, there has been used a quadrature or orthogonal detection system for performing a demodulation or detection process by respectively mixing a reception signal with two local oscillation signals which are orthogonal to each other, i.e., which is phase-shifted by 90 degrees one another, thereby converting the reception signal into two signals orthogonal to each other.

A receiver apparatus utilizing the quadrature detection system is disclosed in the document of, for example, the U.S. Pat. No. 4,814,715 issued to Kasperkovitz, and entitled "MIXER ARRANGEMENT FOR SUPPRESSION OF OSCILLATOR INTERFERENCE IN QUADRATURE DEMODULATORS".

FIG. 1 shows a radio receiver apparatus utilizing a conventional quadrature detection system disclosed in the above-mentioned U.S. Pat. No. 4,814,715, and the radio receiver apparatus will be described hereinafter.

A radio frequency signal (referred to as an RF signal hereinafter) received by an antenna is converted into two base-band signals each including a direct current signal which are orthogonal to each other by a quadrature RF-tuning device T. Thereafter, unnecessary signal components of the base-band signals are removed through low-pass filters LP and LP', and then the resulting signals are outputted as a signal $I_1$ and a signal $I_2$.

The quadrature RF-tuning device T is comprised of quadrature mixing stages $M_{T0}$ and $M'_{T0}$ and a tuning oscillator $T_0$. A mixer arrangement M is comprised of first and second quadrature mixer stages $M_1$ and $M_2$ for mixing quadrature mixing signals supplied from an oscillator $F_0$ with the signal $I_1$ and the signal $I_2$, respectively. Output signals of the first and second quadrature mixer stages $M_1$ and $M_2$ are added together in a superposition circuit $S_0$. Then the resulting added signal is demodulated by a processing reproducing arrangement P. In order to suppress the possible occurrence of cross talk, leak, and DC offset of the oscillator $F_0$, a feedback is effected by means of first and second synchronous detectors $SD_1$ and $SD_2$ and low-pass filters $LP_1$ and $LP_2$.

However, in the radio receiver apparatus utilizing the conventional orthogonal detection system as shown in FIG. 1, the oscillator $F_0$ oscillates and generates a sine-wave signal as a second local oscillation signal in a manner as shown in FIG. 1. Further, in the first and second quadrature mixer stages $M_1$ and $M_2$, there is performed the process of mixing of the signal $I_1$ and the signal $I_2$, respectively, with the sine-wave signal generated by the oscillator $F_0$. Such a circuit construction is relatively complicated, and has not been able to use a clock signal of a microcomputer as the second local oscillation signal. Furthermore, by mixing the reception signal with the output signal of the tuning oscillator $T_0$, namely, the first local oscillation signal having a frequency approximately equal to the center frequency of the reception signal, the reception signal is converted directly into the base-band signals orthogonal to each other. Each of the base-band signals obtained through the conversion process has a DC component. In particular, when the oscillation signal of the tuning oscillator $T_0$ has a frequency drift equal to a deviation of the reception signal due to influence of temperature or a further factor, a significant great DC component is caused in each of the signal $I_1$ and the signal $I_2$, respectively. Therefore, each of the circuits for processing the signal $I_1$ and the signal $I_2$ is required to be a DC amplifier which permits that a direct current flows therein. If the DC component is removed, a reception sensitivity of the radio receiver apparatus may be seriously deteriorated when the first local oscillation signal has a frequency drift. However, such a DC amplifier circuit has been had such a problem that the DC amplifier circuit can not achieve a great amplification degree due to a drift of its reference point attributed to a change of temperature and a fluctuation of a power voltage. Furthermore, it is also possible to interrupt the direct current by means of a capacitor having a sufficiently great capacitance. However, the insertion of the capacitor has been accompanied by such a problem that it takes a long time from a timing when a power starts to be supplied to the receiver apparatus circuit to a timing when the receiver apparatus circuit becomes stable. Furthermore, there has been such a problem that a great noise component is generated at around the DC level due to 1/f-noise of the circuit, resulting in deterioration in the reception sensitivity.

FIG. 10 shows a local oscillator circuit of a prior art for a frequency modulation (FM) radio receiver apparatus.

Referring to FIG. 10, the local oscillator circuit comprises a time constant circuit 101 and a local oscillator 102. A demodulation signal outputted from a frequency to voltage converter (referred to as an f/V converter hereinafter) 100 functioning as an FM demodulator is inputted to the local oscillator 102 through the time constant circuit 101 comprising a in-series-connected resistance R and a in-parallel-connected capacitor C, and then the demodulation signal is passed through a circuit including a variable capacitance diode VD and a coupling capacitor Cc to a voltage controlled oscillator 103.

In the local oscillator circuit shown in FIG. 10, when the time constant of the time constant circuit 101 is set to a relatively small value, the frequency of the output signal of the local oscillator 103 is deviated or fluctuated due to a relatively low frequency component of the demodulation signal. On the other hand, when the time constant of the time constant circuit 101 is set to a relatively large value, it is possible to reduce of the deviation or fluctuation of the frequency of the local oscillator 103, however, there is such a problem that it takes a long time to complete an automatic frequency control (referred to as an AFC hereinafter) operation from a timing when a power switch is turned on.

SUMMARY OF THE INVENTION

An essential object of the present invention is therefore to provide a radio receiver apparatus comprising a local oscillator with an improved automatic frequency control arrangement.

Another object of the present invention is to provide a radio receiver apparatus comprising a local oscillator with an improved automatic frequency control arrangement, capable of stably controlling the frequency of the local oscillator with an operation time shorter than that of the prior art.

A further object of the present invention is to provide a radio receiver apparatus comprising a local oscillator with an improved automatic frequency control arrangement, capable of stably controlling the frequency of the local oscillator without any influence of a frequency drift of the local oscillation.

In order to achieve the aforementioned objective, according to one aspect of the present invention, there is provided a radio receiver apparatus of an orthogonal detection type, comprising:

voltage controlled first local oscillator means for generating a first local oscillation signal having a first local oscillation frequency, which is changed in response to an inputted voltage;

first phase shifter means for shifting a phase of the first local oscillation signal generated by said first local oscillator means by 90 degrees, and outputting a phase-shifted first local oscillation signal;

first mixer means for mixing an inputted reception signal with the first local oscillation signal generated by said first local oscillator means, and outputting a resulting mixed signal;

first band-pass filter means for passing therethrough a desired first intermediate frequency signal having a predetermined first intermediate frequency in response to the mixed signal outputted from said first mixer means, and outputting the first intermediate frequency signal;

second mixer means for mixing the inputted reception signal with the phase-shifted first local oscillation signal outputted from said first phase shifter means, and outputting another resulting mixed signal;

second band-pass filter means for passing therethrough another desired first intermediate frequency signal having the first intermediate frequency in response to the mixed signal outputted from said second mixer means, and outputting another first intermediate frequency signal;

second local oscillator means for generating a second local oscillation signal having a second local oscillation frequency;

second phase shifter means for shifting a phase of the second local oscillation signal generated by said second local oscillator means by 90 degrees, and outputting a phase-shifted second local oscillation signal;

third mixer means for mixing the first intermediate frequency signal outputted from said first band-pass filter means with the second local oscillation signal outputted from said second local oscillator means, and outputting a resulting mixed signal;

fourth mixer means for mixing the another first intermediate frequency signal outputted from said second band-pass filter means with the phase-shifted second local oscillation signal outputted from said phase shifter means, and outputting a further resulting mixed signal;

calculation means for calculating either one of a sum of and a difference between the resulting mixed signal outputted from said third mixer means and the further resulting mixed signal, and outputting a signal representing a resulting calculated result thereof;

third band-pass filter means for passing therethrough a second intermediate frequency signal having a center frequency which is apart from the second local oscillation frequency by a difference frequency between a frequency of the inputted reception signal and the first local oscillation frequency, in response to the signal outputted from said calculation means, and outputting the second intermediate frequency signal;

demodulation means for demodulating the second intermediate frequency signal outputted from said third band-pass filter means, and outputting a resulting demodulated signal;

average frequency detection means for detecting an average frequency of the second intermediate frequency signal outputted from said third band-pass filter means for a predetermined time interval; and frequency correction means for controlling the first local oscillation frequency of the first local oscillation signal generated by said first local oscillator means so that a difference between the average frequency detected by said average frequency detection means and a predetermined frequency corresponding to a center frequency of the second intermediate frequency signal becomes substantially zero.

In the above-mentioned radio receiver apparatus, said average frequency detection means comprises:

pulse waveform shaping means for converting the second intermediate frequency signal into a pulse signal and outputting the pulse signal; and number of pulses measurement means for measuring a number of pulses of the pulse signal outputted from said pulse waveform shaping means for a predetermined time interval corresponding to the center frequency of the second intermediate frequency signal, and outputting to said frequency correction means, the measured number as data corresponding to the average frequency of the second intermediate frequency signal.

In the above-mentioned radio receiver apparatus, said average frequency detection means comprises:

pulse waveform shaping means for converting the second intermediate frequency signal into a pulse signal and outputting the pulse signal; and time interval measurement means for measuring a time interval by a timing when a number of pulses of the pulse signal outputted from said pulse waveform shaping means becomes a predetermined value corresponding to the center frequency of the second intermediate frequency signal, and outputting to said frequency correction means, the measured time interval as data corresponding to the average frequency of the second intermediate frequency signal.

In the above-mentioned radio receiver apparatus, said average frequency detection means comprises:

frequency to voltage converter means for converting the frequency of the second intermediate frequency signal outputted from said third band-pass filter into a voltage in proportional to the frequency thereof, and outputting the voltage; and average voltage detector means for detecting an average value of the voltage outputted from said frequency to voltage converter means for a predetermined time interval corresponding to the center frequency of the second intermediate frequency signal, and outputting to said frequency correction means, the detected average value as data corresponding to the average frequency of the second intermediate frequency signal.

In the above-mentioned radio receiver apparatus, said second local oscillator means generates a rectangular-wave second local oscillation signal.

In the above-mentioned radio receiver apparatus, each of said third and fourth mixer means comprises:

inverter means for inverting a signal inputted to each of said third and fourth mixer means, and outputting an inverted signal; and switch means for alternately switching over between the signal inputted to each of said third and fourth mixer means and the inverted signal thereof, in response to the rectangular-wave second local oscillation signal, thereby outputting the mixed signal between the signal inputted to each of said third and fourth mixer means and the rectangular-wave second local oscillation signal.

In the above-mentioned radio receiver apparatus, the inputted reception signal is frequency-modulated signal with a predetermined frequency deviation, and the first and second local oscillation frequencies are set so that a sum of the second local oscillation frequency and a difference frequency between the frequency of the inputted reception signal and the first local oscillation frequency is higher than the frequency deviation of the inputted reception signal.

In the present invention, there is caused a frequency drift in the oscillation frequency of the first local oscillator means such that the oscillation frequency thereof is the same as the deviation of the reception signal, then significant large DC components may be caused in the output signals of the first and second mixer means, and these DC components are removed by the first and second band-pass filters means. In this case, signal components necessary for demodulation is lost, and this results in that the demodulation operation can not be performed. In order to perform the above-mentioned automatic frequency control using the frequency correction means, the above frequency drift could be removed such that there is caused no relatively large DC component in the output signals of the first and second mixers means. Then an improved demodulation can be always performed without influence due to the above-mentioned frequency drift of the first local oscillation.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENTS

The preferred embodiments according to the present invention will be described below with reference to the attached drawings.

FIRST PREFERRED EMBODIMENT

Figure 1:
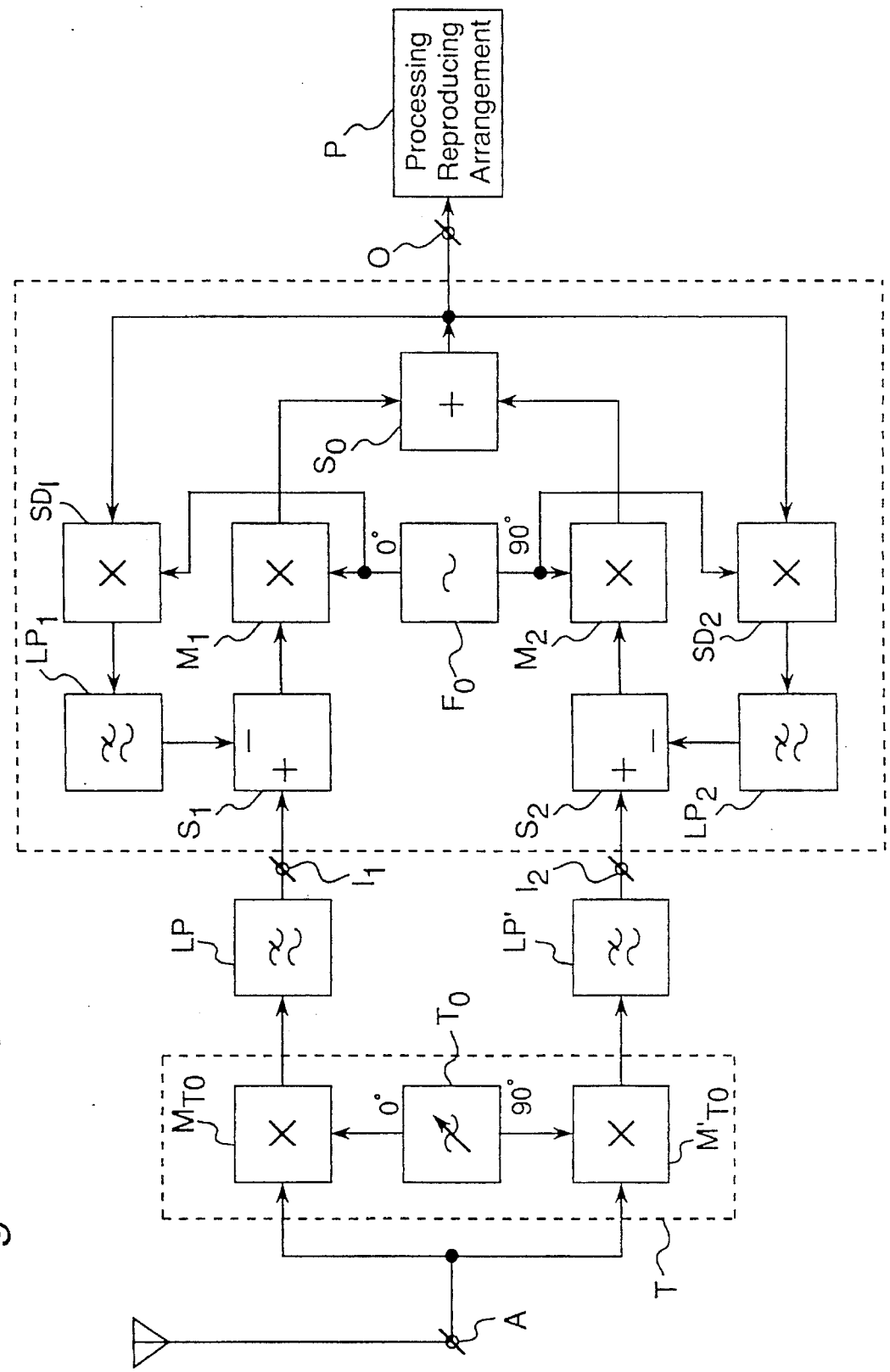
FIG. 1 is a block diagram of a radio receiver apparatus of a prior art using an orthogonal detection system.
Figure 2:
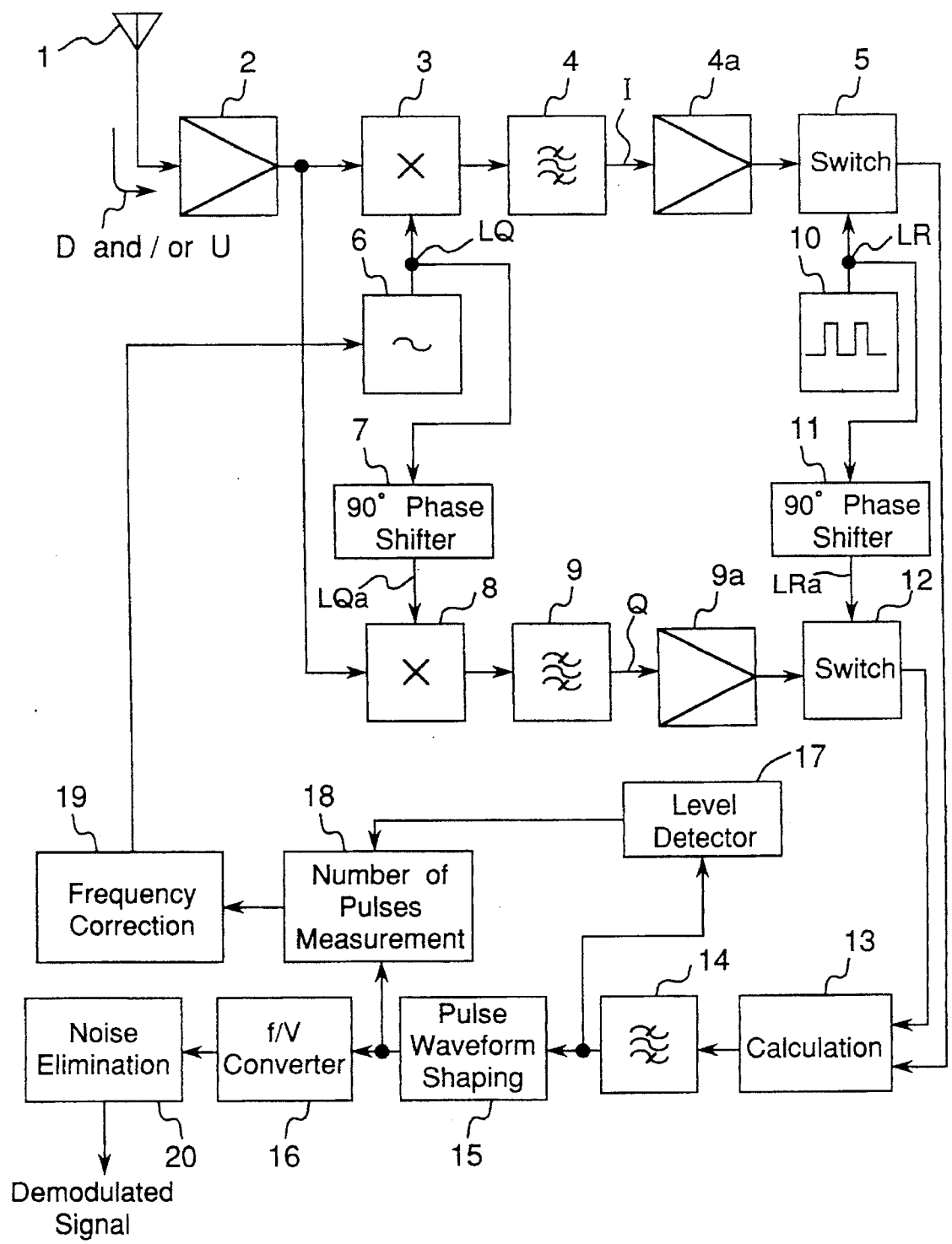
FIG. 2 is a block diagram of a radio receiver apparatus of an orthogonal detection type according to a first preferred embodiment of the present invention.

FIG. 2 shows a radio receiver apparatus of an orthogonal detection type according to a first preferred embodiment of the present invention.

Referring to FIG. 2, a radio signal is received by an antenna 1, and the received radio signal is inputted through a high-frequency low-noise amplifier 2 to a mixer 3 and another mixer 8.

In the preferred embodiment, the desired radio signal D to be received by the antenna 1 is expressed by the following equation (1):

$$D=\cos(\omega+\Delta\omega)\cdot t \qquad (1),$$

where $\omega$ is an angular frequency of a carrier wave, and $\Delta\omega$ is an angular frequency deviation having both positive and negative polarities. The angular frequency deviation $\Delta\omega$ changes in time depending on data or a speech signal, namely, a carrier wave signal of the desired radio signal D is modulated at a transmitter according to data or a speech signal to be transmitted. In other words, the desired radio signal D is a frequency-modulated signal, i.e., FM signal. In the case of data to be transmitted, the desired radio signal D is an FSK signal. Please note that the angular frequency $\omega$ of the carrier wave signal is the center frequency of the desired signal D.

A voltage controlled first local oscillator 6 generates a sine-wave first local oscillation signal LQ expressed by the following equation (2) and then outputs the first local oscillation signal LQ to the mixer 3 and the 90° phase shifter 7:

$$LQ=\cos(\omega+x)\cdot t \qquad (2),$$

where "x" represents an angular shift frequency from the angular frequency $\omega$ of the carrier wave signal, and is the first intermediate frequency in the present preferred embodiment. In a 90° phase shifter 7, the phase of the signal LQ outputted from the local oscillator 6 is shifted by 90 degrees, and then the 90° phase shifter 7 outputs a phase-shifted first local oscillation signal LQa=sin(ω+x)·t to the mixer 8.

Consequently, there are respectively generated following signals by the mixers 3 and 8;
(a) Output of the mixer 3:

$$D \times LQ = \cos(\Delta\omega - x) \cdot t \qquad (3),$$

and
(b) Output of the mixer 8:

$$D \times LQa = \sin(\Delta\omega - x) \cdot t \qquad (4).$$

In the present case, the shift frequency "x" is set so that the shift frequency "x" is greater than the frequency deviation fie. In other words, the shift frequency "x" is set so as to be higher than the occupied bandwidth of the desired signal D. For example, when a plurality of desired signals D are arranged at a channel interval of 12.5 kHz, it is generally determined that the occupied bandwidth is ±4.25 kHz=8.5 kHz in the case of transmitting a speech signal, data having a bandwidth corresponding to the speech signal, or the like. In this case, the angular frequency deviation Δω is smaller than ±2.5 kHz. Accordingly, there is selected a value of the shift frequency "x"=6.25 kHz or 12.5 kHz as a value located outside of the occupied bandwidth. In the present preferred embodiment, it is determined that "x"=6.25 kHz. With the above-mentioned setting arrangement, the signals respectively outputted from the mixers 3 and 8 have no DC component.

The signal outputted from the mixer 3 is passed through a first band-pass filter 4 having a band-pass width of the occupied bandwidth of 8.5 kHz for removing adjacent channel components from the inputted signal by passing therethrough only a desired first intermediate frequency signal of a specified channel having a predetermined first intermediate frequency, and further passed through an intermediate frequency amplifier 4a, then being inputted as a first intermediate frequency signal I (referred to as an I signal hereinafter) to a first switch circuit 5. On the other hand, the signal outputted from the mixer 8 is passed through a second band-pass filter 9 having a band-pass width of the occupied bandwidth of 8.5 kHz for removing adjacent channel components from the inputted signal by passing therethrough only a desired first intermediate frequency signal of a specified channel having the predetermined first intermediate frequency, and further passed through an intermediate frequency amplifier 9a, then being inputted as another first intermediate frequency signal Q (referred to as a Q signal hereinafter) to a second switch circuit 12. In this case, the I and Q signals are orthogonal to each other.

Further, a second local oscillator 10 generates and outputs a rectangular-wave or pulse-shaped second local oscillation signal LR expressed by the following equation to the first switch circuit 5 and a 90° phase shifter 11:

$$LR = \cos(r \cdot t) - (\tfrac{1}{3}) \cdot \cos(3 \cdot r \cdot t) + (\tfrac{1}{5}) \cdot \cos(5 \cdot r \cdot t) - \ldots \qquad (5).$$

In the present preferred embodiment, the angular frequency "r" of the second local oscillation signal is set to 16 kHz. The 90° phase shifter 11 shifts the phase of the second local oscillation signal LR by 90 degrees and outputs the phase-shifted second oscillation signal LRa expressed by the following equation (6) to the second switch circuit 12:

$$LRa = \sin(r \cdot t) + (\tfrac{1}{3}) \cdot \sin(3 \cdot r \cdot t) + (\tfrac{1}{5}) \cdot \sin(5 \cdot r \cdot t) - \ldots \qquad (6).$$

Thereafter, the I signal is multiplied in the first switch circuit 5 by the rectangular-wave second local oscillation signal LR generated by the second local oscillator 10. On the other hand, the Q signal is multiplied in the second switch circuit 12 by the phase-shifted rectangular-wave second local oscillation signal LRa. Consequently, there are generated the following signals by the switch circuits 5 and 12:
(a) Output of switch circuit 5:

$$\cos\{(\Delta\omega - x) \cdot t\} \cdot \{\cos(rt) - (\tfrac{1}{3}) \cdot \cos(3 \cdot r \cdot t) + \ldots \} \qquad (7),$$

and
(b) Output of switch circuit 12:

$$\sin\{(\Delta\omega - x) \cdot t\} \cdot \{\sin(rt) + (\tfrac{1}{3}) \cdot \sin(3 \cdot r \cdot t) + \ldots \} \qquad (8).$$

The first and second switch circuits 5 and 12 operate as frequency mixers or signal multipliers, respectively, each switch circuit mixing or multiplying the inputted first intermediate signal with the pulse second local oscillation signal and outputting a resulting mixed signal. Then the signals respectively outputted from the switch circuit 5 and 12 are added together by a calculation circuit 13. Consequently, the following signal is outputted from the calculation circuit 13:

$$\cos[(r+x) - \Delta\omega] \cdot t] - (\tfrac{1}{3}) \cdot \cos[(3 \cdot r - x) + \Delta\omega] \cdot t] + \ldots \qquad (9).$$

The signal outputted from the calculation circuit 13 is passed through a third band-pass filter 14 for removing signals of terms relating to a high frequency component having an angular frequency "r" which are generated by the switch circuits 5 and 12, i.e., the second and subsequent terms of the equation (9), by passing therethrough only a signal of the first terms of the equation (9), and then the signal outputted from the band-pass filter 14 is outputted to a level detector 17 and a pulse waveform shaping circuit 15. In this case, the third band-pass filter 14 outputs the following signal:

$$\cos[\{(r+x) - \Delta\omega\} \cdot t] = \cos\{(2\pi \times 22.25[\text{kHz}] - \Delta\omega \cdot t\} \qquad (10).$$

In the preferred embodiment, since such a condition of (r+x)>|Δω| is set as described above, the phase of the equation (10) is always positive in the positive time. In other words, no negative frequency is generated in the preferred embodiment. Therefore, as is apparent from the above-mentioned equation (10), the output signal outputted from the third band-pass filter 14 can be regarded as such a frequency-modulated signal obtained when the carrier wave signal having an angular frequency of (r+x) is frequency-modulated with a frequency deviation of Δω, wherein the angular frequency (r+x) is the second intermediate frequency in the present preferred embodiment. Therefore, the above-mentioned frequency-modulated signal outputted from the third band-pass filter 14 can be demodulated by a f/V converter 16 which generates an output voltage proportional to the frequency of the inputted signal.

In the preferred embodiment, the signal outputted from the third band-pass filter 14 is inputted through a pulse waveform shaping circuit 15 for shaping the waveform of the inputted signal into a pulse waveform to the f/V converter 16. Further, a noise elimination process is performed on a demodulated signal outputted from the f/V converter 16 by a noise elimination circuit 20 for removing pulse noises which may be caused due to the FM demodulation in the FM demodulation process of the f/V converter 16, and thereafter, the processed demodulated signal is outputted from the noise elimination circuit 20.

Since the third band-pass filter 14 has a relatively low band-pass center frequency of about 22.25 kHz, the band-pass filter 14 can be easily implemented by a monolithic IC. Further, the other devices or circuits handle such low frequencies, and therefore the other devices or circuits can be implemented by monolithic ICs.

In the case where the following undesired interference signal U is received by the antenna 1:

$$U = \cos(\omega + 2x + \Delta\omega) \cdot t \qquad (11).$$

Then, there are generated in the radio receiver apparatus shown in FIG. 2, the I and Q signals, respectively, expressed by the following equations:
(a) I signal:

$$U \times LQ = \cos(\Delta\omega + x) \cdot t \qquad (12),$$

and
(b) Q signal:

$$U \times LQa = \sin(\Delta\omega + x) \cdot t \qquad (13).$$

The above interference signals are generated within the same bandwidth of the band-pass filters 4 and 9, as those of the desired signals in the I and Q signals, and therefore, the undesired interference signal can not be removed by the first and second band-pass filters 4 and 9. However, in this case, the calculation circuit 13 outputs the following signal:

$$\cos[\{(r-x)-\Delta\omega\}\cdot t]-(\tfrac{1}{3})\cdot\cos(\{(3\cdot r+x)+\Delta\omega\}\cdot t]+\ldots \qquad (14).$$

The frequency band of the undesired interference signal U expressed by the equation (14) is obviously different from the frequency band of the desired signal D expressed by the above-mentioned equation (9). Therefore, the signal of the above equation (14) generated due to the undesired interference signal is removed by the third band-pass filter 14 which is designed so as to pass only the signal around the center frequency (r+x)=22.25 kHz therethrough, and then, consequently no undesired interference signal is generated in the output terminal of the third band-pass filter 14.

In above-mentioned preferred embodiment of the present invention, it has been described that the I and Q signals have the same signal level. However, when there is a difference between the signal levels of the I and Q signals due to a variation of circuits, there is generated at the output terminal of the calculation circuit 13, a signal having the same frequency band as that expressed by the above-mentioned equation (9) due to the undesired interference signal U. In view of the above, by providing a level adjustment circuit or level attenuator (not shown) for adjusting the signal levels of the I and Q signals so as to cancel the undesired interference signal component generated within the frequency band expressed by the above-mentioned equation (9), there can be constructed a receiver apparatus less susceptible to the interference. In stead of such a level attenuator, there may be provided a gain-adjustable intermediate frequency amplifier 4a or 9a as the intermediate frequency amplifier 4a or 9a.

Figure 3:
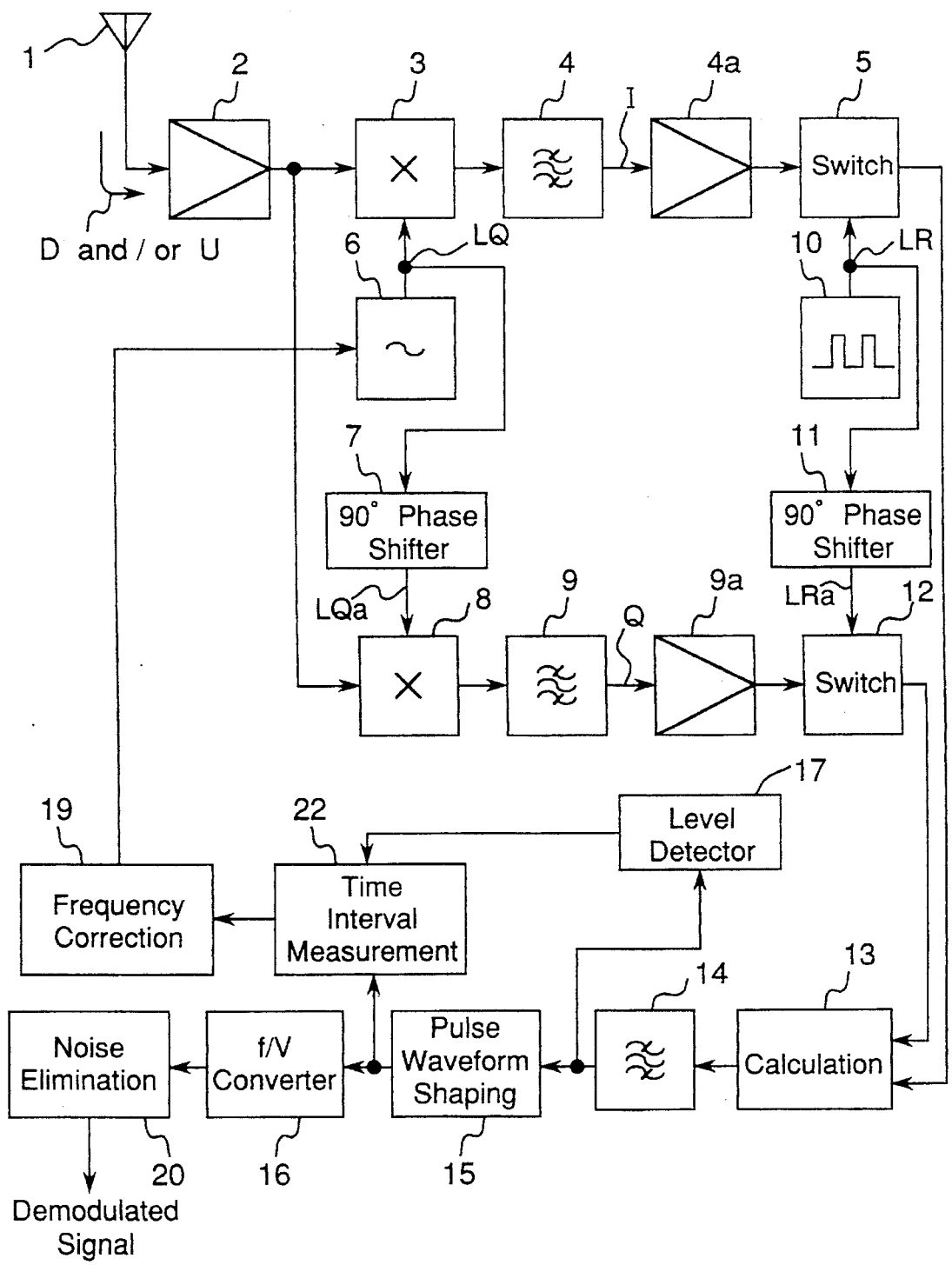
FIG. 3 is a block diagram of a radio receiver apparatus of an orthogonal detection type according to a second preferred embodiment of the present invention.

Further, depending on the switch construction of the first and second switch circuits 5 and 12, a signal component having an angular frequency "r" may be caused in the output terminals of the switch circuits 5 and 12. In the above-mentioned case, as shown in FIG. 3, the rectangular-wave second local oscillation signal outputted from the second local oscillator 10 may be added by an adder circuit 140 through a level attenuator 141 to the output signal of the first switch circuit 5 or the second switch circuit 12 so as to cancel the signal component having the angular frequency "r".

Figure 13:
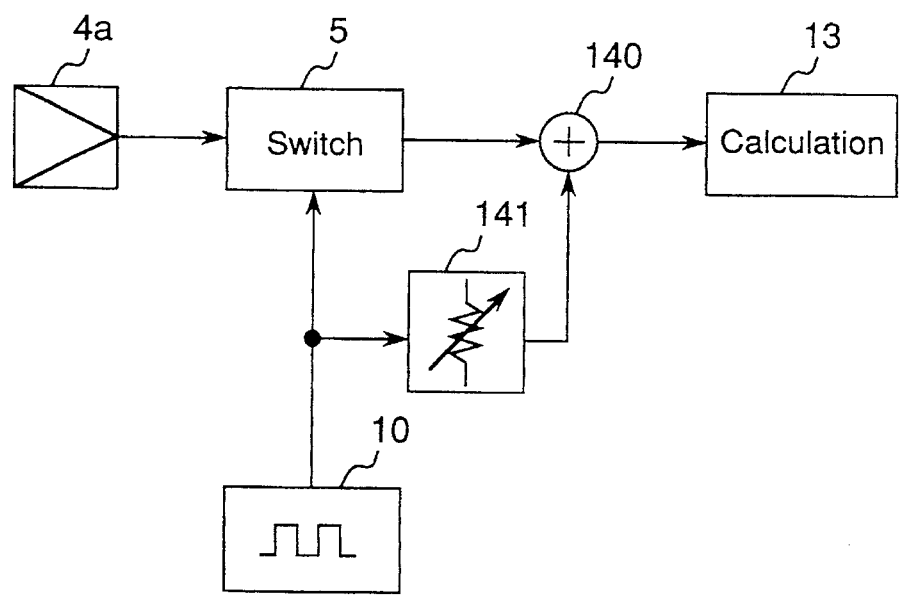
FIG. 13 is a block diagram of a modified switch circuit of a further preferred embodiment.

Referring to FIG. 13, the second local oscillation signal may be supplied through the level attenuator 141 to an adder circuit 140 as well as the switch circuit 5. In this case, the signal outputted from the switch circuit 5 is inputted to the adder circuit 140, which then adds the inputted two signals and outputs the signal of the addition result to the calculation circuit 13. The level attenuator 141 and the adder circuit 140 are applied to the second switch circuit 12 in a manner similar to above.

Furthermore, depending on the switch construction of the first and second switch circuits 5 and 12, the signal component having the angular frequency "r" may be caused in the first and second switch circuits 5 or 12. In the above-mentioned case, as shown in FIG. 14, the I or Q signal outputted from the amplifier 4a or 9a may be added by an adder circuit 150 through a level attenuator 51 to the output signal from the first switch circuit 5 or the second switch circuit 12 so as to cancel the I or Q signal.

Figure 14:
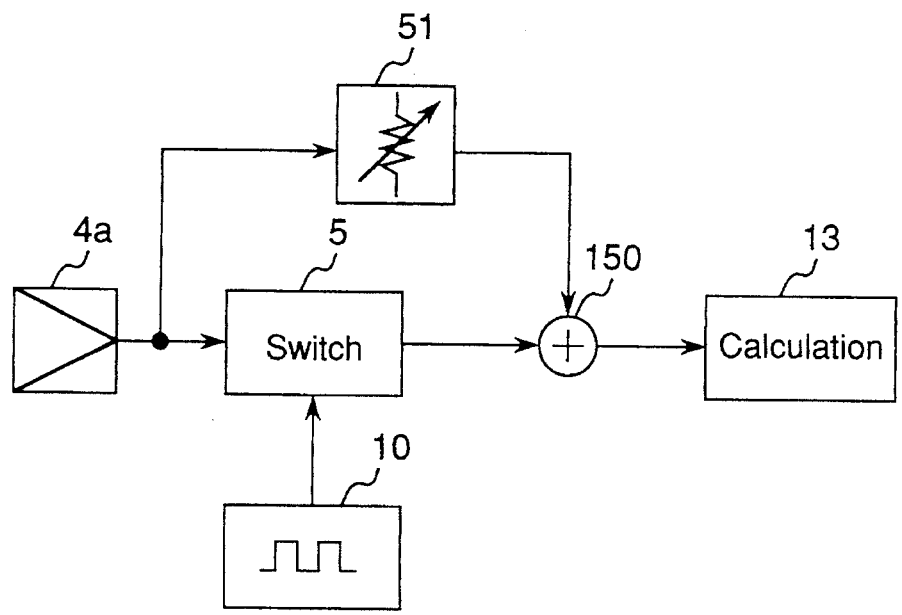
FIG. 14 is a block diagram of another modified switch circuit of a still further preferred embodiment.

Referring to FIG. 14, the signal outputted from the intermediate frequency amplifier 4a is inputted through the level attenuator 51 to the adder circuit 150, as well as to the switch circuit 5. The signal outputted from the switch circuit 5 is inputted to the adder circuit 150, which then adds the inputted two signals and outputs a resulting signal of the addition result to the calculation circuit 13.

Furthermore, when setting the local oscillation frequency of the first local oscillator 6 to a frequency separated apart by the occupied bandwidth of the reception signal in a manner as described hereinbefore, no DC component is generated in the I and Q signals. With the above-mentioned arrangement, therefore, the reception signal suffers no removal of energy even when the signals outputted from the mixers 3 and 8 are respectively passed through the first band-pass filter 4 and the second band-pass filter 9, each of which does not pass any DC component therethrough. Accordingly, in this case, the reception sensitivity of the radio receiver apparatus does not deteriorate.

Here is next considered a construction in which the local oscillation frequency of the first local oscillator 6 is set to a frequency substantially equal to the center frequency of the reception signal. In the present case, the I and Q signals have any DC components. When the degree of modulation is significantly great as compared with the transmission rate of the data to be transmitted using the carrier wave signal, i.e., when the modulation index is significantly relatively great, the energy of the frequency-modulated signal or FM signal is concentrated on two frequencies separated apart by $\pm\Delta\omega$ corresponding to the degree of modulation from the center angular frequency of the frequency-modulated carrier wave signal, and the percentage of the energy exists around the center frequency of the frequency-modulated signal is significantly small. Accordingly, no significant influence is exerted on the reception sensitivity even when the DC components are removed through the first band-pass filter 4 and the second band-pass filter 9 from the signals outputted from the mixers 3 and 8.

However, when the local oscillation frequency of the first local oscillator 6 causes a fluctuation in a degree of modulation of about Δω due to influence attributed to a change of temperature, the percentage of the energy around the direct current of the I and Q signals is increased. Therefore, when the DC components of the I and Q signals are removed through the first band-pass filter 4 and the second band-pass filter 9, the reception sensitivity deteriorates.

In view of the above, there is employed a frequency correction circuit for detecting a frequency drift of the first local oscillation frequency and controlling the oscillation frequency of the first local oscillator 6 in a direction in which the frequency drift reduces to substantially zero. A control method for controlling the oscillation frequency of the first local oscillator 6 will be described hereinafter.

Figure 11:
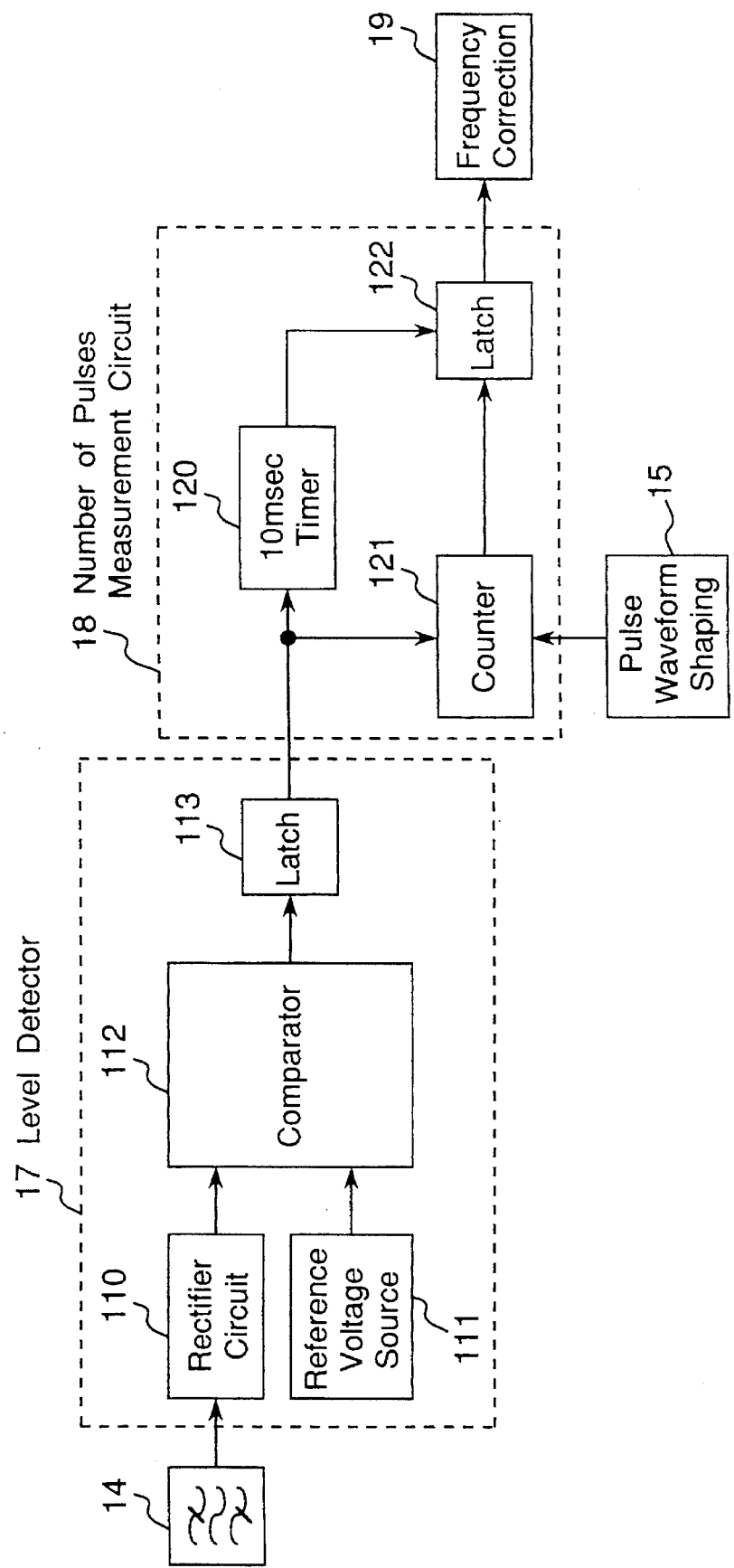
FIG. 11 is a block diagram of a level detector and a number of pulses measurement circuit 18 shown in FIG. 2.

FIG. 11 shows a detailed composition of the level detector 17 and the number of pulses measurement circuit 18.

Referring to FIG. 17, the level detector 17 comprises a rectifier circuit 110, a reference voltage source 111, a comparator 112 and a latch circuit 113, and the number of pulses measurement circuit 18 comprises a 10 milliseconds timer, a counter 121 and a latch circuit 122. The output signal from the third band-pass filter 14 is inputted through the rectifier circuit 110 to the comparator 112, whereas a predetermined threshold voltage generated by the reference voltage source is inputted to the comparator 112. When the output level of the third band-pass filter 14 is equal to or larger than the predetermined threshold voltage, the comparator 112 outputs a high-level signal through the latch circuit 113 to a 10 milliseconds timer 120 and the counter 121.

On the other hand, the pulse waveform shaping circuit 15 amplifies the output signal from the third band-pass filter 14 and converts the resulting amplified signal into a pulse signal by means of a comparator, the converted pulse signal being outputted to the f/V converter 16 and the number of pulses measurement circuit 18. The f/V converter 16 performs an FSK (frequency shift keying) modulation process by converting the change of frequency of the input into a change of voltage, and the demodulated signal is outputted through the above-mentioned noise elimination circuit 20.

In response to the high-level signal from the level detector 17, the counter 121 and the timer 120 are activated so that the counter 121 starts to count the pulses of the output signal from the pulse waveform shaping 15, and counts the same pulses for 10 milliseconds. When the time of 10 milliseconds has been passed from the start of the counter 121, the timer 120 outputs a high-level signal to the latch circuit 122 so that the latch circuit 122 latches data representing the number of the pulses counted by the counter 121, which is then outputted to the frequency correction circuit 19.

The frequency correction circuit 19 calculates a difference between a predetermined reference number of pulses corresponding to the center frequency of the intermediate frequency signal of 16 kHz and the number of pulses measured by the number of pulses measurement circuit 18, and generates a control voltage corresponding to the difference therebetween. Then, the control voltage controls the oscillation frequency of the first local oscillator 6, and then the average frequency of a second intermediate frequency signal outputted from the third band-pass filter 14 is made to be approximately 16 kHz.

The above-mentioned frequency correction operation will be described in more detail below.

Here is now considered a case where the oscillation frequency of the first local oscillator 6 is shifted by 3 kHz from the frequency of the carrier wave signal of the FSK modulation or FM signal received by the antenna 1. In this case, the center frequency of the second intermediate frequency signal outputted from the third band-pass filter 14 is shifted by 3 kHz from 16 kHz to become 19 kHz. The number of pulses measurement circuit 18 measures the 19-kHz second intermediate frequency signal pulses for 10 milliseconds, and therefore 190 pulses may be counted. On the other hand, a reference number of pulses of 160 pulses is stored in this case, and therefore a difference of 30 is generated by the frequency correction circuit 19, which then generates and outputs a DC voltage corresponding to the difference of 30 through a digital to analogue conversion process to the first local oscillator 6, thereby controlling the first local oscillator 6 so that the center frequency of the second intermediate frequency signal outputted from the third band-pass filter 14 becomes approximately 16 kHz.

In the present preferred embodiment, the pulse waveform shaping circuit 15 and the time interval measurement circuit 22 constitute an average frequency detecting circuit for detecting an average frequency of the second intermediate frequency signal outputted from the third band-pass filter 14.

In the case of an FSK radio receiver apparatus, the radio receiver apparatus is intermittently turned on for a short time of about 20 milliseconds at a predetermined interval, e.g., a time interval of 30 seconds. When no high-level signal is generated from the level detector 17 while the power is supplied to the radio receiver apparatus, it is determined that no signal is transmitted from the other party for communications, and the supply of power is slopped for the next time interval of 30 seconds. When the high-level signal is generated by the level detector 17, the supply of power is continued, and the number of pulses measurement circuit 18 measures the number of pulses. The above-mentioned technique is to operate the FSK radio receiver apparatus using a battery for a relatively long time.

The synchronizing operation of transmission and reception of the FSK signal with the other party of communications performed every 30 seconds can be achieved in such a manner that one party surely transmits the FSK signal every 10 minutes, and the other party receives the transmitted radio FSK signal to synchronize the clock with that of the party which transmits the FSK signal. For the above-mentioned purpose, it is possible to perform the level detection at a signal portion or signal interval modulated with a bit synchronization signal in the FSK modulation signal from the other party for communications and to count the number of pulses.

it is to be noted that the frequency correction circuit 19 can be simply implemented by, for example, a storage unit for storing the reference number of pulses and a microcomputer having a digital to analogue conversion function.

Figure 7:
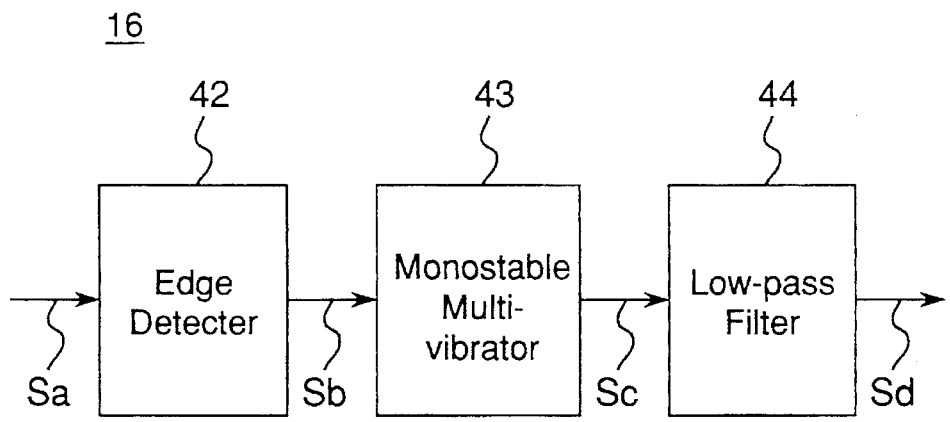
FIG. 7 is a block diagram of a frequency to voltage converter 16 shown in FIGS. 2, 3 and 4.

FIG. 7 shows an exemplified construction of the f/v converter 16.

Referring to FIG. 7, the f/V converter 16 comprises an edge detector 42, a monostable multivibrator 43 and a low-pass filter 44. The pulse signal outputted from the pulse waveform shaping circuit 15 is inputted to the edge detector 42.

Figure 8:
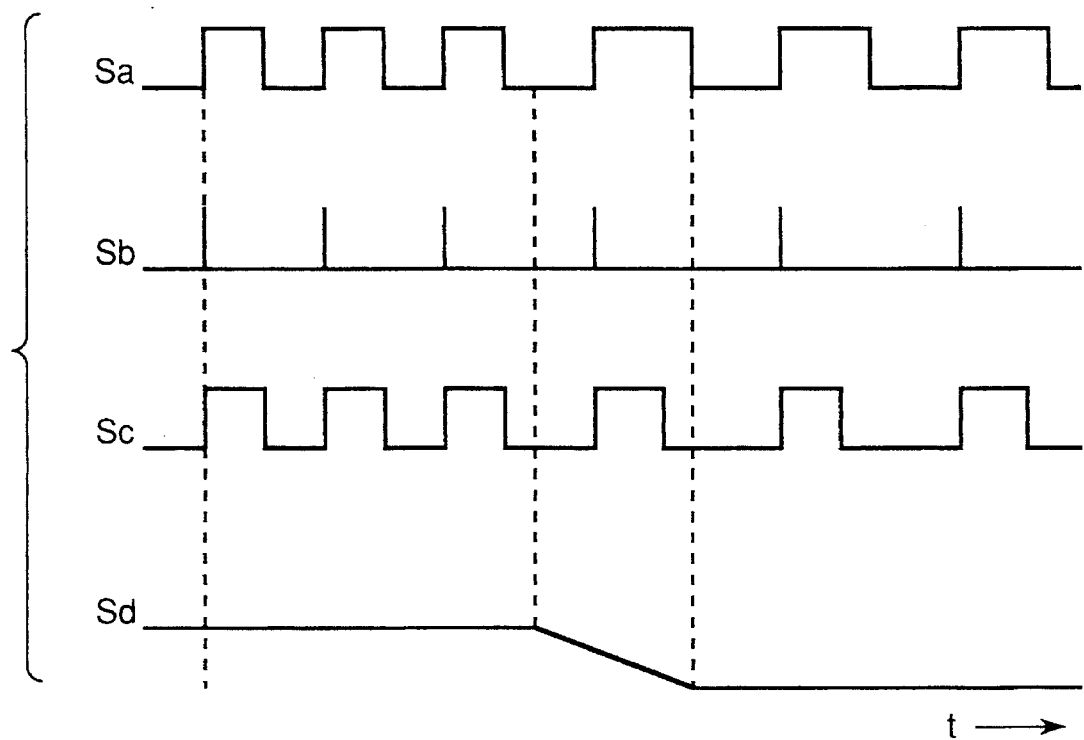
FIG. 8 is a timing chart showing an operation of the frequency to voltage converter 16 shown in FIG. 7.
Figure 9:
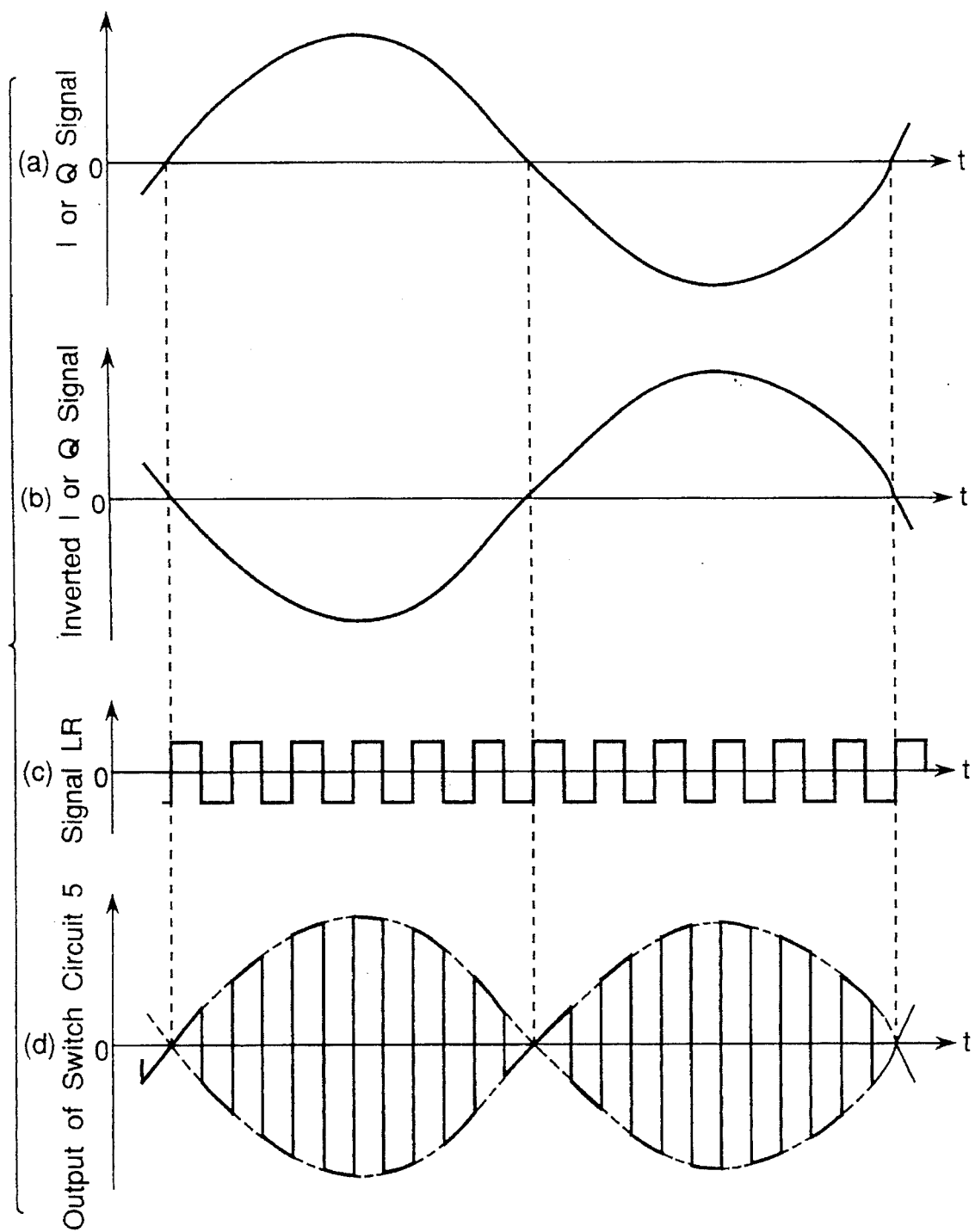
FIG. 9 is a timing chart showing an operation of the switch circuits 5 and 12 shown in FIG. 5.
Figure 10:
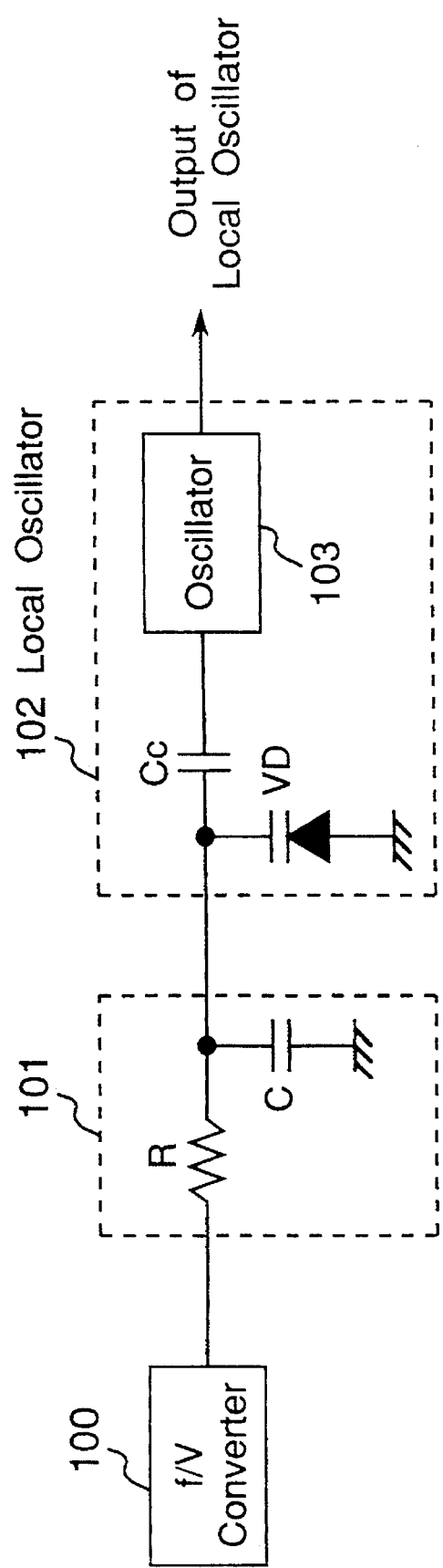
FIG. 10 is a local oscillator circuit of a prior art.

FIG. 8 shows a timing chart of respective signals Sa, Sb, Sc and Sd shown in FIG. 7, wherein Sa denotes the pulse signal outputted from the pulse waveform shaping circuit 15 to the edge detector 42, Sb denotes a signal is inputted from the edge detector 42 to the monostable multivibrator 43, Sc denotes a pulse signal inputted from the monostable multivibrator 43 to the low-pass filter 44, and Sd is a signal outputted from the low-pass filter 44 to the noise elimination circuit 20.

Referring to FIGS. 7 and 8, a leading edge of the inputted intermediate frequency pulse Sa is detected by the edge detector 42, which then outputs a impulse signal representing the timing of the leading edge of the signal Sa to the monostable multivibrator 43. The detected leading edge represented by the impulse signal Sb activates the monostable multivibrator 43, which then outputs a pulse signal Sc having a constant pulse width to the low-pass filter 44. Thereafter, the low-pass filter 44 performs a low-pass filtering process on the inputted pulse signal Sc to output a frequency-to-voltage-converted or demodulated signal.

The signal outputted from the monostable multivibrator 43 is a pulse signal having the same frequency as that of the intermediate frequency pulse signal Sa outputted from the pulse waveform shaping circuit 15. Therefore, the circuit covering up to the monostable multivibrator 43 is regarded as the pulse waveform shaping circuit 15, and then the output signal from the monostable multivibrator 43 can be inputted to the number of pulses measurement circuit 18 shown in FIG. 2 or a time interval measurement circuit 22 shown in FIG. 3 which will be described in detail later.

Although the above has described that the edge detector 42 detects only the leading edge of the second intermediate frequency signal Sa, the present invention is not limited to this. The detector may detect both the leading edge and the trailing edge of the second intermediate frequency signal Sa. In this case, the output frequency of the monostable multivibrator 43 is twice as high as that of the second intermediate frequency signal Sa. Therefore, when the circuit covering up to the monostable multivibrator 43 is regarded as the pulse waveform shaping circuit 15, it is required to change operation constants such as the reference number of pulses and the number of pulses, with respect to the pulses measurement circuit 18, the time interval measurement circuit 22, and the frequency correction circuit 19, taking into consideration the fact that the frequency is doubled.

Furthermore, when a signal having a significant large level is inputted to the antenna 1 and consequently the output of the calculation circuit 13 is disadvantageously clipped, it can be considered that the information necessary for the demodulation may drop out. Therefore, by adopting a construction in which, for example, the amplification degree of a high-frequency amplifier 2 is made adjustable so that the output of the calculation circuit 13 is not clipped, a greater effect can be produced.

Figure 4:
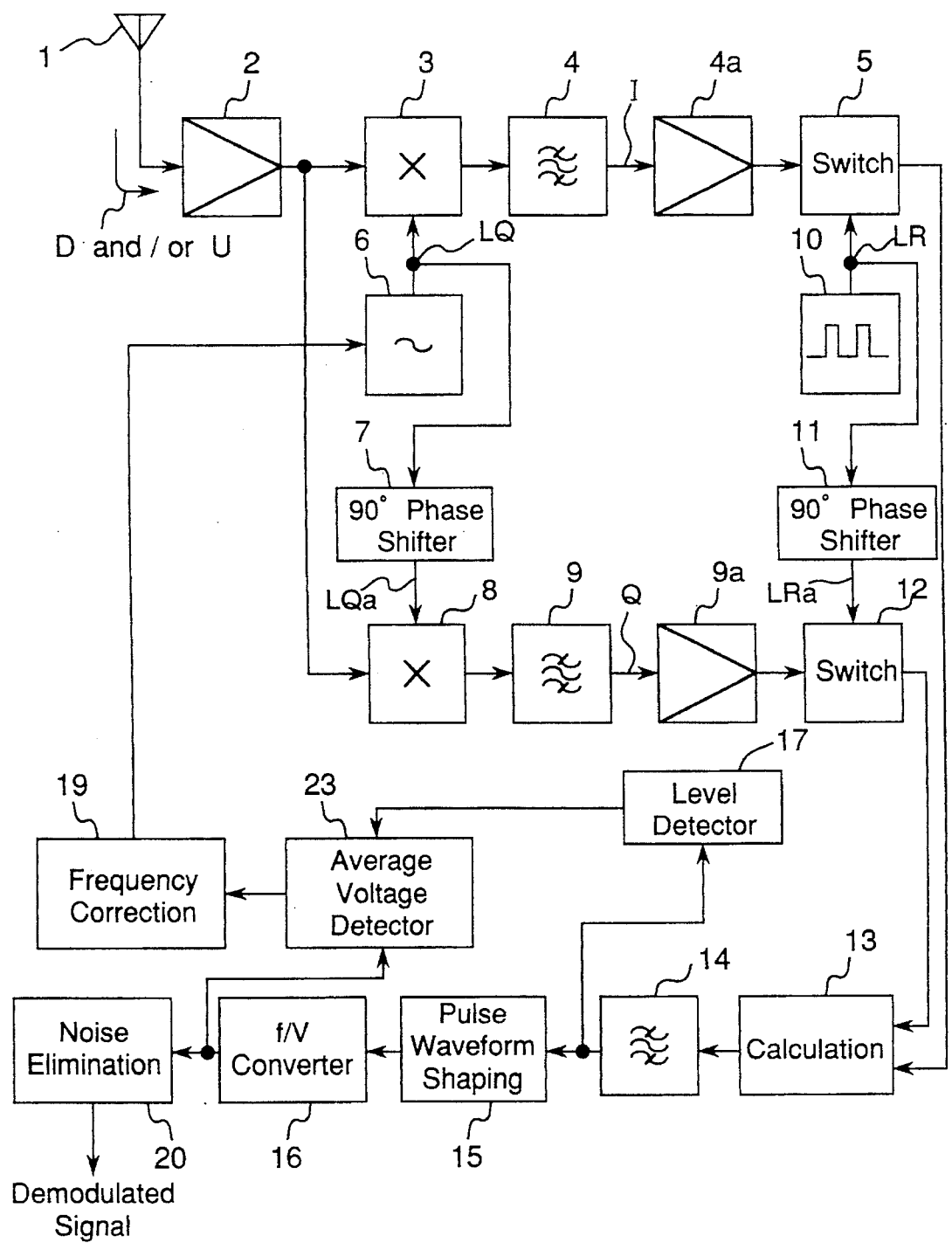
FIG. 4 is a block diagram of a radio receiver apparatus of an orthogonal detection type according to a third preferred embodiment of the present invention.

Although the above has described that the calculation circuit 13 shown in FIGS. 2, 3 and 4 performs the operation of addition, the circuit may perform an operation of subtraction. In the above-mentioned case, the output of the third band-pass filter 14 becomes $\cos[\{(r-x)+\Delta\omega\}\cdot t]$.

Figure 5:
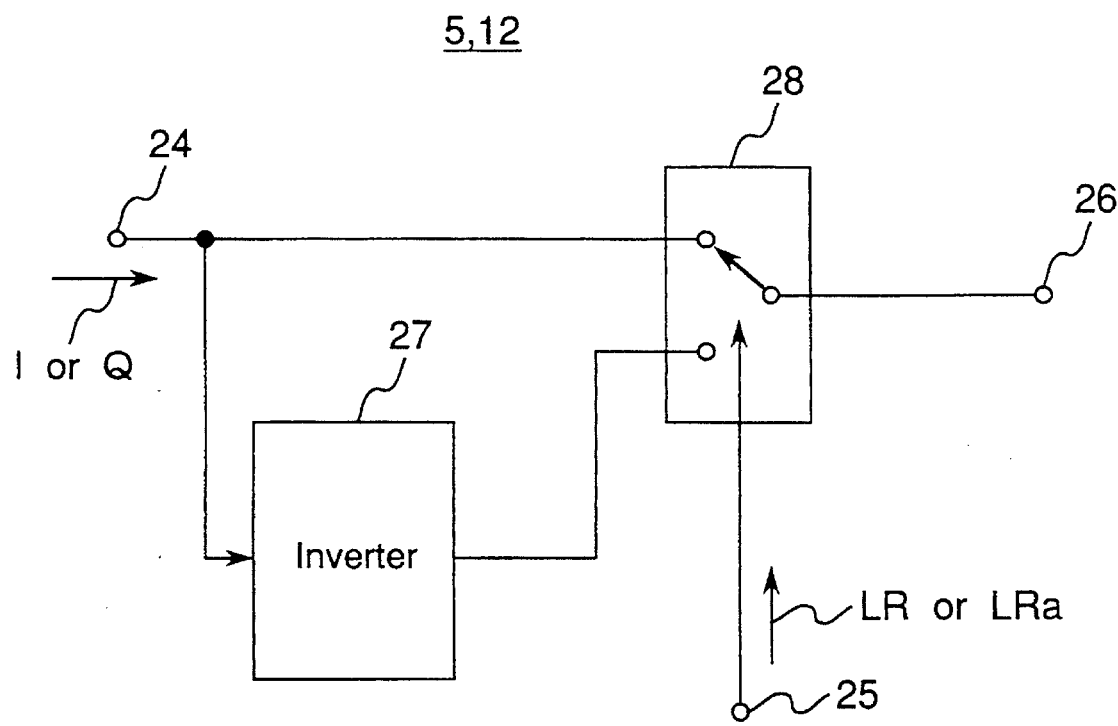
FIG. 5 is a block diagram of switch circuits 5 and 12 shown in FIGS. 2, 3 and 4.

FIG. 5 shows a construction of the switch circuits 5 and 12 shown in FIGS. 2, 3, and 4, and FIG. 6 shows respective waveforms provided in the switch circuits 5 and 12.

Referring to FIG. 5, the I or Q signal is inputted through an input terminal 24 to a first input terminal of an electronic switch 28 such as an FET switch or the like, and is also inputted through an inverter 27 having an amplification degree of 1 to a second input terminal of the switch 28.

On the other hand, the rectangular-wave signal LR or LRa respectively inputted from the second local oscillator 10 or the 90° phase shifter 11 to a control terminal of the switch 28. The electronic switch 28 is alternately switched over between the first and second input terminals thereof to switch the two signals inputted thereto, in response to the rectangular-wave signal LR or LRa, namely, depending on whether the phase of the second local oscillation pulse signal LR or LRa has a positive polarity or a negative polarity, so that the I or Q signal is passed through the switch 28 at the positive phase of the second local oscillation pulse signal LR or LRa, whereas the inverted I or Q signal from the inverter 27 is passed through the switch 28 at the negative phase of the second local oscillation pulse signal LR or LRa.

Such an electronic switch 28 can be simply implemented by a CMOS as an analogue switch, or constituted by a bipolar transistor. Each of the first switch circuit 5 and the second switch circuit 12 may have a construction achieved by combining differential amplifiers.

Figure 6:
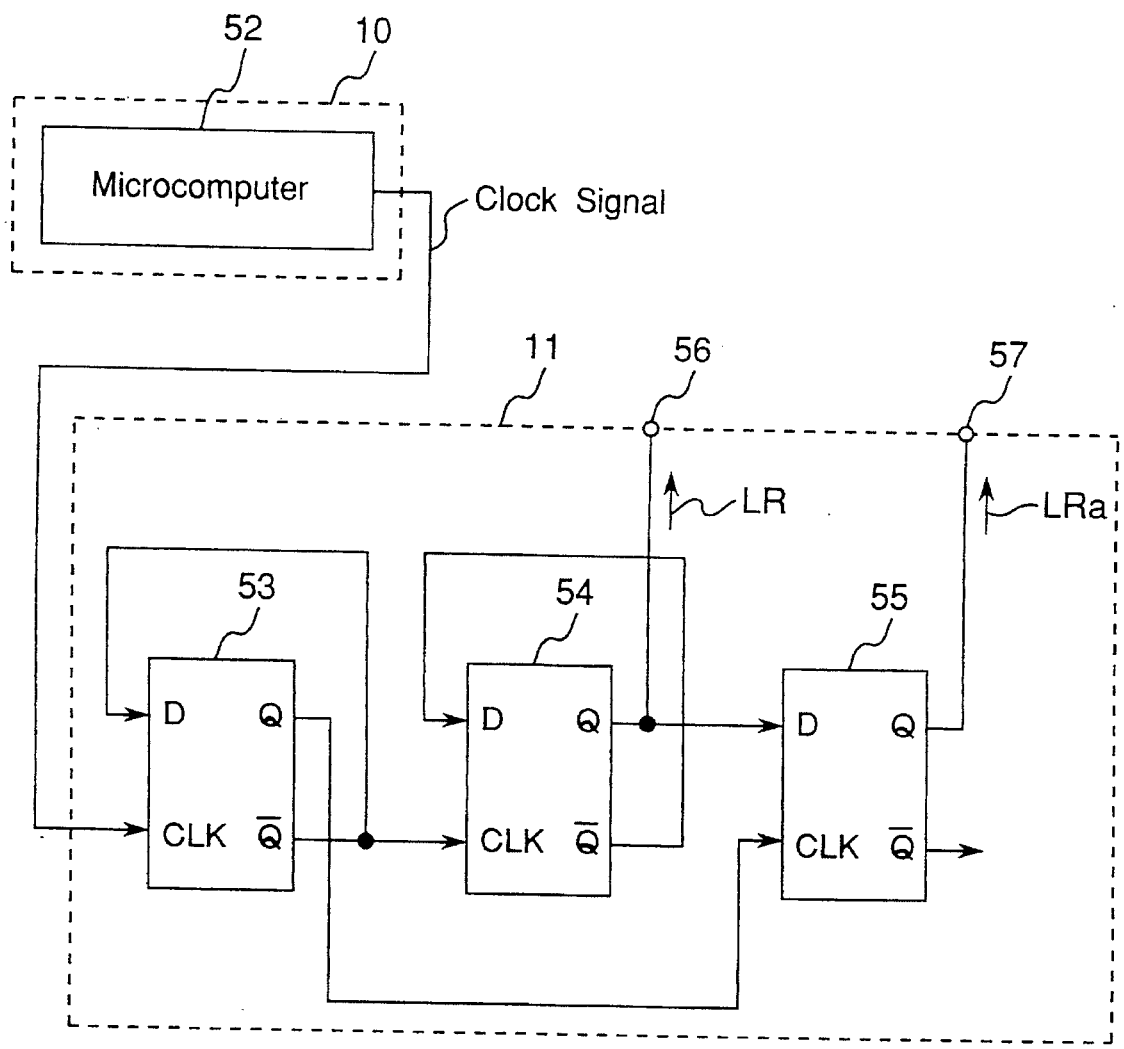
FIG. 6 is a block diagram of a second local oscillator 10 and a 90° phase shifter 11 shown in FIGS. 2, 3 and 4.

FIG. 6 shows a constructions of the second local oscillator 10 and the 90° phase shifter 11.

Referring to FIG. 6, the second local oscillator 10 comprised of a microcomputer 52 outputs a clock pulse signal to a clock input terminal of a flip-flop 53. The 90° phase shifter 11 comprises three delay type flip-flops 53, 54 and 55.

The signal outputted from an output terminal $\overline{Q}$ of the flip-flop 53 is inputted to a clock input terminal CLK of the flop-flop 54 and an input terminal D of the flop-flop 53. The signal outputted from an output terminal Q of the flip-flop 53 is inputted to an clock input terminal CLK of the flip-flop 55. Further, the signal outputted from an output terminal Q of the flip-flop 54 is an input terminal D of the same flop-flop 54, and the signal outputted from an output terminal Q of the flip-flop 54 is inputted to an input terminal D of the flip-flop 55.

The rectangular-wave or pulse second local oscillation signal LR is outputted from the output terminal Q of the flip-flop 54 through an output terminal 56, while the rectangular-wave or pulse second local oscillation signal LRa orthogonal to the second local oscillation signal LR, namely, phase-shifted by 90 degrees from the signal LR is outputted from the output terminal Q of the flip-flop 55 through the output terminal 57. The circuit of the 90° phase shifter 11 shown in FIG. 6 can be simply implemented by an IC.

In the present preferred embodiment, there is caused a frequency drift in the oscillation frequency of the first local oscillator 6 such that the oscillation frequency thereof is the same as the deviation of the reception signal, then significant large DC components may be caused in the output signals of the first and second mixers 3 and 8, and these DC components are removed by the band-pass filters 4 and 9. In this case, signal components necessary for demodulation is lost, and this results in that the demodulation operation can not be performed. In order to perform the above-mentioned automatic frequency control using the frequency correction circuit 19, the above frequency drift could be removed such that there is caused no relatively large DC component in the output signals of the mixers 3 and 8. Then an improved demodulation can be always performed without influence due to the above-mentioned frequency drift of the first local oscillation.

SECOND PREFERRED EMBODIMENT

FIG. 3 shows a composition of a radio receiver apparatus of an orthogonal detection type according to a second preferred embodiment of the present invention. In FIG. 3, components having the same functions as those of the components in FIG. 2 are denoted by the same reference numerals. The second preferred embodiment of the present invention shown in FIG. 3 differs from the first preferred embodiment of the present invention shown in FIG. 2, in that there is provided in the present preferred embodiment shown in FIG. 3, a time interval measurement circuit 22 for measuring a time interval to a timing when the number of pulses of the intermediate frequency pulse signal outputted from the pulse waveform shaping circuit 15 reaches a predetermined threshold value, instead of the number of pulses measurement circuit 18 shown in FIG. 2.

In this case, the pulse waveform shaping circuit 15 and the time interval measurement circuit 22 constitute an average frequency detection circuit for detecting an average frequency of the second intermediate frequency signal outputted from the third band-pass filter 14.

Figure 12:
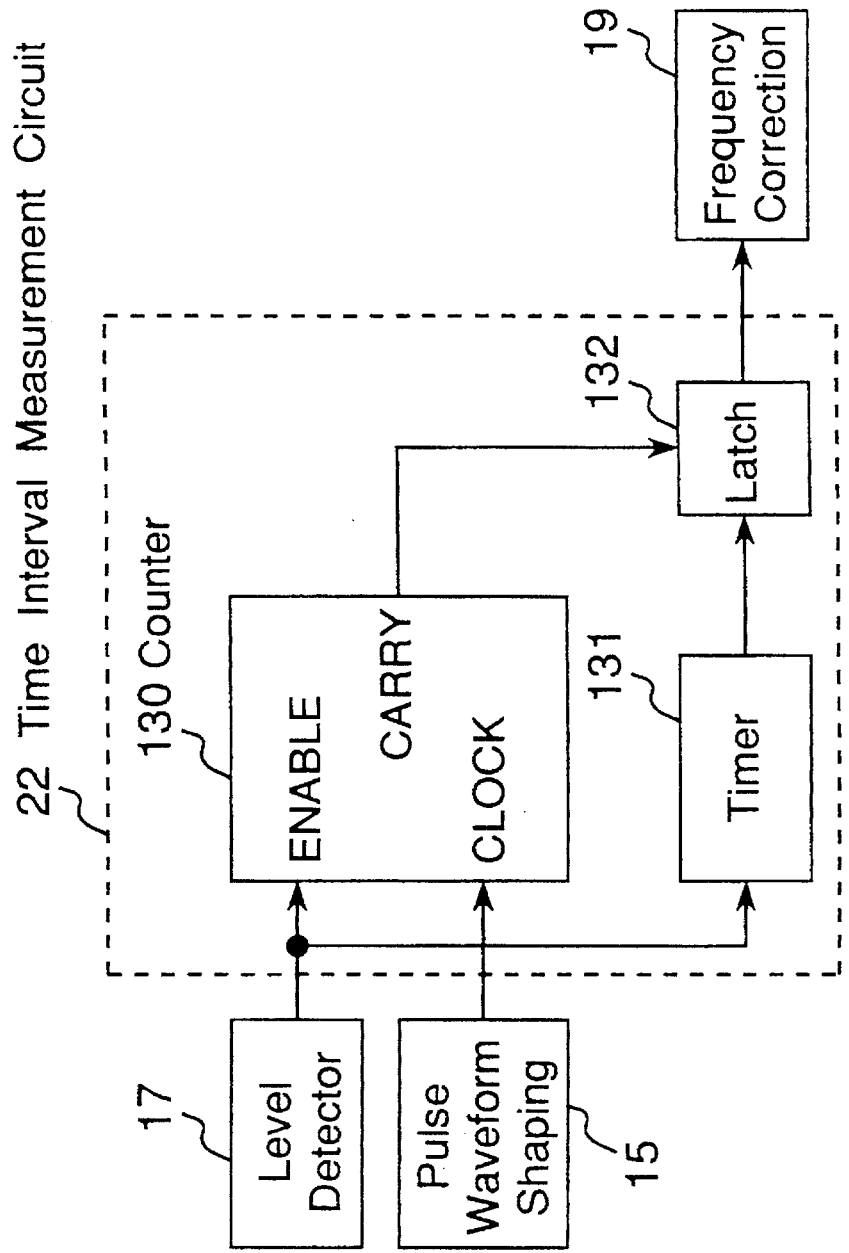
FIG. 12 is a block diagram of a time interval measurement circuit 22 shown in FIG. 3.

FIG. 12 shows a composition of the time interval measurement circuit 22 shown in FIG. 3. Referring to FIG. 12, the time interval measurement circuit 22 comprises a counter 130, a 10 milliseconds timer 131, and a latch circuit 132. The high-level signal outputted from the level detector 17 is inputted to an enable input terminal ENABLE of the counter 130, whereas the pulse signal outputted from the pulse waveform shaping circuit 15 is inputted to a clock input terminal CLOCK of the counter 130.

When the output signal from the level detector 17 becomes a high level, the counter 130 is started to count the pulses outputted from the pulse waveform shaping circuit 15. Thereafter, the counter 130 has counted 160 pulses, and then generates and outputs a carry signal to the latch circuit 132. On the other hand, the timer 131 is activated to be started to count a time interval having been passed from a timing when the output signals from the level detector 17 becomes a high level so as to output data representing the counted time to the latch circuit 132. When the counter 130 generates the carry signal, the time data is latched by the latch circuit 132, and then is outputted to the frequency correction circuit 19.

In the present preferred embodiment, upon detecting the fact that an FSK modulation signal is inputted to the antenna 1, the level detector 17 outputs the high-level signal. The high-level signal activates the counter 130 and the timer 131 of the time interval measurement circuit 22. Then the counter 130 counts or measures a time interval from a timing when the counter 130 is activated to a timing when the number of pulses of the second intermediate frequency signal reaches, for example, 160. When the center frequency of the second intermediate frequency signal is 16 kHz, the time interval measured by the counter 130 is 10 milliseconds. When the center frequency of the second intermediate frequency signal is 19 kHz, the time interval measured by the timer 131 of time interval measurement circuit 22 is 8.42 milliseconds.

The time data measured by the timer 131 of the time interval measurement circuit 22 is inputted through the latch circuit 132 to the frequency correction circuit 19. The frequency correction circuit 19, which stores a predetermined reference time interval of 10 milliseconds, calculates a time difference between the reference time interval and the inputted time data. When the inputted time data is 10 milliseconds, the time difference is zero, and therefore no frequency correction operation is performed. On the other hand, when the inputted time data is 8.42 milliseconds, the time difference is 1.58 milliseconds, and therefore a control voltage corresponding to 1.58 milliseconds is outputted. Then the oscillation frequency of the first local oscillator 6 is controlled so that the frequency of the second intermediate frequency signal outputted from the third band-pass filter 14 is made to be approximately 16 kHz in response to the control voltage outputted from the frequency correction circuit 19.

An advantageous effect of the preferred embodiment shown in FIG. 3 is that the measurement accuracy of the center frequency of the second intermediate frequency signal outputted from the third band-pass filter 14 can be improved to allow the frequency correction operation to be performed more accurately by increasing the accuracy of the timer 131 included in time interval measurement circuit 22.

The above-mentioned other modifications in the first preferred embodiment can be applied to the second preferred embodiment, and the other advantageous effects in the first preferred embodiment can be obtained also in the second preferred embodiment.

THIRD PREFERRED EMBODIMENT

FIG. 4 shows a composition of a radio receiver apparatus of an orthogonal detection type according to a third preferred embodiment of the present invention. The present preferred embodiment of the present invention will be described below with reference to FIG. 4.

In FIG. 4, components having the same functions as those of the components shown in FIG. 2 are denoted by the same reference numerals. The present preferred embodiment of the present invention shown in FIG. 4 differs from the preferred embodiment of the present invention shown in FIG. 2, in that there is provided in the third preferred embodiment, an average voltage detector 23 for detecting a voltage output corresponding to the frequency of the second intermediate frequency signal in the f/V converter 16, averaging the detected voltage for a predetermined interval, and outputting the resulting average voltage data, instead of the number of pulses measurement circuit 18 shown in FIG. 2.

In the present preferred embodiment, the f/V converter 16 and the average voltage detector 23 constitute an average frequency detection circuit for detecting an average frequency of the second intermediate frequency signal outputted from the third band-pass filter 14.

Upon detecting the fact that an FSK modulation signal is inputted to the antenna 1, the level detector 17 outputs the high-level signal. The high-level signal activates the average voltage detector 23. The average voltage detector 23 averages the voltage for, for example, 10 milliseconds from a timing when the average voltage detector 23 is activated. On the other hand, the f/v converter 16 outputs a voltage proportional to the frequency of the inputted signal from the pulse waveform shaping circuit 15. For example, when the frequency of the intermediate frequency of the signal inputted to f/V converter 16 is 16 kHz, the output of the f/V converter 16 changes by 0.1 volts every time when the frequency changes by 1 kHz. Therefore, when the frequency of the intermediate frequency is 19 kHz, an output voltage of 1.3 volts is generated and outputted from the f/V converter 16. The voltage data averaged by the average voltage detector 23 is inputted to the frequency correction circuit 19. The frequency correction circuit 19, which stores a reference voltage of 1 volt, calculates a difference between the reference voltage and the inputted voltage data.

For example, when the voltage data inputted to the frequency correction circuit 19 is 1 volt, the difference is zero and therefore, no frequency correction operation is performed. When the inputted voltage data is 1.3 volts, the difference is 0.3 volts, and therefore a control voltage corresponding to 0.3 volts is outputted to the first local oscillator 6. Then the oscillation frequency of the first local oscillator 6 is controlled so that the frequency of the second intermediate frequency signal outputted from the third band-pass filter 14 is made to be approximately 16 kHz in response to the control voltage from the frequency correction circuit 19.

It can be considered that the output voltage of the f/V converter 16 changes momently due to influence of the temperature and other factors even if the input frequency is identical. Therefore, the reference voltage stored in the frequency correction circuit 19 is required to be changed momently as the time passes. As a method for achieving the above-mentioned operation, there can be used the following method. When no signal is inputted to the antenna 1, the second intermediate frequency signal is mere noise. Therefore, the center frequency of the noise signal is the center frequency of 16 kHz of the third band-pass filter 14. There is further performed a switching operation on the basis of the second local oscillation frequency of 16 kHz in the first and second switch circuits 5 and 12.

Although each of the first and second switch circuits 5 and 12 has a balanced type switch construction such that no local oscillation frequency of 16 kHz is caused in the output terminals of the first and second switch circuits 5 and 12, the 16-kHz signal slightly leaks in the output terminals thereof due to a variation of transistors constituting each of the balanced type switch circuits 5 and 12. Therefore, when no signal is inputted to the antenna 1, the center frequency of the second intermediate frequency signal is approximately 16 kHz. Therefore, when the level detector 17 detects no signal input to the antenna 1, the output signal of the f/V converter 16 may be taken or stored in the average voltage detector 23 for a predetermined time interval such as 10 milliseconds, and the resulting averaged voltage data may be stored into a storage device of the frequency correction circuit 19. The above-mentioned storage operation is performed, for example, every 10 minutes, or an integral multiple of 30 seconds.

Furthermore, in order to positively leak the 16-kHz signal, the bias of each of the first and second switch circuits 5 and 12 may be changed to loose a balance of each of the switch circuits 5 and 12, thereby allowing the second local oscillation signal to leak.

The above-mentioned other modifications in the first preferred embodiment can be applied to the third preferred embodiment, and the other advantageous effects in the first preferred embodiment can be obtained also in the third preferred embodiment.

As described above, the radio receiver apparatus of the present invention adopts the construction in which the signal generated due to the harmonic components of the second local oscillation signal is removed by means of the third band-pass filter 14. With the above-mentioned construction, a rectangular-wave or pulse signal can be used as the second local oscillation signal. Therefore, the clock pulse signal of the microcomputer 52 can be utilized as the second local oscillation signal, thereby allowing the relevant circuit to be simplified.

Furthermore, there is required no DC component for the demodulation of the signal. With the above-mentioned arrangement, there can be provided a highly reliable radio receiver apparatus which can reduce the startup time at the time of supplying the power and prevent the possible deterioration of the reception sensitivity by removing the influence of the DC drift attributed to a change of temperature and the influence of 1/f noise of the circuit. Of course, no expensive mechanical filter is necessary allowing each relevant circuit to be easily fabricated into an IC, and therefore the radio receiver apparatus can be implemented at relatively inexpensive cost.

Furthermore, by providing a level adjustment circuit to cancel the unnecessary interference signal taking into consideration the variation of the amplification degree of each of the amplifiers and the circuits, there can be provided a receiver apparatus less susceptible to the interference.

By further incorporating the frequency correction circuit 19, there is produced such an effect that no deterioration of reception occurs because the oscillation frequency can be corrected even when the oscillation frequency accuracy of the first local oscillator is poor. Therefore, an inexpensive crystal oscillator can be used.

Furthermore, by using the noise elimination circuit 20, the pulse noise can be removed to allow the signal-to-noise characteristic to be improved.

Of course the first and second switches circuits 5 and 12, the average frequency detector 23, and so forth can be each implemented with a simple construction and easily fabricated into an IC.

In an intermittent operation system in which the transmission and reception of signals are performed intermittently by establishing a synchronous relationship between the transmitter side and the receiver side in order to make the radio apparatus operate on a battery for a relatively long time, it is required to check whether any signal is there from the other party to our party for a time interval as short as possible. The above means that the time interval from the timing when the power starts to be supplied to the radio receiver apparatus to the timing when the operation of the radio receiver apparatus becomes stable is required to be as short as possible. The present invention can be applied to such an intermittent operation system, and is able to produce a great effect in extending the life time of the battery. In particular, in the case of an automatic meter inspection system such as a gas meter or the like, when a radio transceiver is made in the gas meter, there is required a small size radio receiver apparatus which can operate on a battery for about ten years.

In a radio type remote control apparatus for use in a residential facility system, such as a remote control apparatus for wirelessly connecting a gas hot-water supply apparatus with a kitchen, being not limited to the automatic meter inspection system, the small size and the battery based operation are indispensable conditions.

The present invention can provide a radio receiver apparatus very effective in regard to the above-mentioned problem.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A radio receiver apparatus of an orthogonal detection type, comprising:

voltage controlled first local oscillator means for generating a first local oscillation signal having a first local oscillation frequency, which is changed in response to an inputted voltage;

first phase shifter means for shifting a phase of the first local oscillation signal generated by said voltage controlled first local oscillator means by 90 degrees, and outputting a phase-shifted first local oscillation signal;

first mixer means for mixing an inputted reception signal with the first local oscillation signal generated by said voltage controlled first local oscillator means, and outputting a resulting mixed signal;

first band-pass filter means for passing therethrough a desired first intermediate frequency signal having a predetermined first intermediate frequency in response to the mixed signal outputted from said first mixer means, and outputting the first intermediate frequency signal;

second mixer means for mixing the inputted reception signal with the phase-shifted first local oscillation signal outputted from said first phase shifter means, and outputting another resulting mixed signal;

second band-pass filter means for passing therethrough another desired first intermediate frequency signal having the first intermediate frequency in response to the mixed signal outputted from said second mixer means, and outputting another first intermediate frequency signal;

second local oscillator means for generating a second local oscillation signal having a second local oscillation frequency;

second phase shifter means for shifting a phase of the second local oscillation signal generated by said second local oscillator means by 90 degrees, and outputting a phase-shifted second local oscillation signal;

third mixer means for mixing the first intermediate frequency signal outputted from said first band-pass filter means with the second local oscillation signal outputted from said second local oscillator means, and outputting a resulting mixed signal;

fourth mixer means for mixing the another first intermediate frequency signal outputted from said second band-pass filter means with the phase-shifted second local oscillation signal outputted from said phase shifter means, and outputting a further resulting mixed signal;

calculation means for calculating either one of a sum of and a difference between the resulting mixed signal outputted from said third mixer means and the further resulting mixed signal, and outputting a signal representing a resulting calculated result thereof;

third band-pass filter means for passing therethrough a second intermediate frequency signal having a center frequency which is apart from the second local oscillation frequency by a difference frequency between a frequency of the inputted reception signal and the first local oscillation frequency, in response to the signal outputted from said calculation means, and outputting the second intermediate frequency signal;

demodulation means for demodulating the second intermediate frequency signal outputted from said third band-pass filter means, and outputting a resulting demodulated signal;

average frequency detection means for detecting an average frequency of the second intermediate frequency signal outputted from said third band-pass filter means for a predetermined time interval; and frequency correction means for controlling the first local oscillation frequency of the first local oscillation signal generated by said voltage controlled first local oscillator means so that a difference between the average frequency detected by said average frequency detection means and a predetermined frequency corresponding to a center frequency of the second intermediate frequency signal becomes substantially zero.

2. The radio receiver apparatus as claimed in claim 1, wherein said average frequency detection means comprises:

pulse waveform shaping means for converting the second intermediate frequency signal into a pulse signal and outputting the pulse signal; and number of pulses measurement means for measuring a number of pulses of the pulse signal outputted from said pulse waveform shaping means for a predetermined time interval corresponding to the center frequency of the second intermediate frequency signal, and outputting to said frequency correction means, the measured number as data corresponding to the average frequency of the second intermediate frequency signal.

3. The radio receiver apparatus as claimed in claim 1, wherein said average frequency detection means comprises:

pulse waveform shaping means for converting the second intermediate frequency signal into a pulse signal and outputting the pulse signal; and time interval measurement means for measuring a time interval by a timing when a number of pulses of the pulse signal outputted from said pulse waveform shaping means becomes a predetermined value corresponding to the center frequency of the second intermediate frequency signal, and outputting to said frequency correction means, the measured time interval as data corresponding to the average frequency of the second intermediate frequency signal.

4. The radio receiver apparatus as claimed in claim 1, wherein said average frequency detection means comprises:

frequency to voltage converter means for converting the frequency of the second intermediate frequency signal outputted from said third band-pass filter into a voltage in proportional to the frequency thereof, and outputting the voltage; and average voltage detector means for detecting an average value of the voltage outputted from said frequency to voltage converter means for a predetermined time interval corresponding to the center frequency of the second intermediate frequency signal, and outputting to said frequency correction means, the detected average value as data corresponding to the average frequency of the second intermediate frequency signal.

5. The radio receiver apparatus as claimed in claim 1, wherein said second local oscillator means generates a rectangular-wave second local oscillation signal.

6. The radio receiver apparatus as claimed in claim 5, wherein each of said third and fourth mixer means comprises:

inverter means for inverting a signal inputted to each of said third and fourth mixer means, and outputting an inverted signal; and switch means for alternately switching over between the signal inputted to each of said third and fourth mixer means and the inverted signal thereof, in response to the rectangular-wave second local oscillation signal, thereby outputting the mixed signal between the signal inputted to each of said third and fourth mixer means and the rectangular-wave second local oscillation signal.

7. The radio receiver apparatus as claimed in claim 1, wherein the inputted reception signal is frequency-modulated signal with a predetermined frequency deviation, and the first and second local oscillation frequencies are set so that a sum of the second local oscillation frequency and a difference frequency between the frequency of the inputted reception signal and the first local oscillation frequency is higher than the frequency deviation of the inputted reception signal.

* * * * *